United States Patent
Brooker et al.

(10) Patent No.: US 11,604,669 B2
(45) Date of Patent: Mar. 14, 2023

(54) SINGLE USE EXECUTION ENVIRONMENT FOR ON-DEMAND CODE EXECUTION

(71) Applicant: Amazon Technologies, Inc., Seattle, WA (US)

(72) Inventors: Marc Brooker, Seattle, WA (US); Mikhail Danilov, Sammamish, WA (US); Osman Surkatty, Seattle, WA (US); Tao Chen, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 495 days.

(21) Appl. No.: 16/782,873

(22) Filed: Feb. 5, 2020

(65) Prior Publication Data
US 2021/0240509 A1    Aug. 5, 2021

(51) Int. Cl.
*G06F 9/455*    (2018.01)
*G06F 12/0882*    (2016.01)
*G06F 12/0891*    (2016.01)

(52) U.S. Cl.
CPC ...... *G06F 9/45558* (2013.01); *G06F 12/0882* (2013.01); *G06F 12/0891* (2013.01); *G06F 2009/45583* (2013.01)

(58) Field of Classification Search
CPC ............. G06F 9/45558; G06F 12/0882; G06F 12/0891; G06F 2009/45583
See application file for complete search history.

(56) References Cited

U.S. PATENT DOCUMENTS

| | | | |
|---|---|---|---|
| 9,323,552 B1 | 4/2016 | Adogla et al. | |
| 2011/0167196 A1* | 7/2011 | Scales | G06F 11/2023 711/6 |
| 2018/0143865 A1 | 5/2018 | Wagner et al. | |

OTHER PUBLICATIONS

Chow, Jim, et al.; Shredding Your Garbage: Reducing Data Lifetime Through Secure Deallocation; USENIX Association; 14th USENIX Security Symposium; in 16 pages.
International Search Report/Written Opinion dated May 25, 2021; Application No. PCT/US2021/016425 filed Feb. 3, 2021, in 25 pages.
Sun, Michael H.; Fast, et al., Lightweight Virtual Machine Checkpointing; Georgia Institute of Technology; in 6 pages.

* cited by examiner

*Primary Examiner* — Wissam Rashid
(74) *Attorney, Agent, or Firm* — Knobbe, Martens, Olson & Bear, LLP

(57) ABSTRACT

Systems and methods are provided for efficiently configuring an execution environment for an on-demand code execution system to handle a single request (or session) for a single user. Once the session or request is complete, the execution environment is reset, such as by having the hardware processor state, memory, and storage reset. In particular, prior to the execution of code, state of the execution environment of the host computing device is retrieved, such as hardware processor(s), memory, and/or storage state. Moreover, during execution of the code instructions, intermediate state can be gathered. Following the execution of the code, the execution environment is reset based on the saved state related to the hardware processor(s), memory, and/or storage. A subsequent code execution securely occurs in the execution environment and the execution environment is reset again, and so forth.

21 Claims, 9 Drawing Sheets

SINGLE USE EXECUTION ENVIRONMENT FOR ON-DEMAND CODE EXECUTION

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf of, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources. In some virtualization contexts, a snapshot of a virtual machine can be taken and the virtual machine can be restored to the snapshot.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1A:
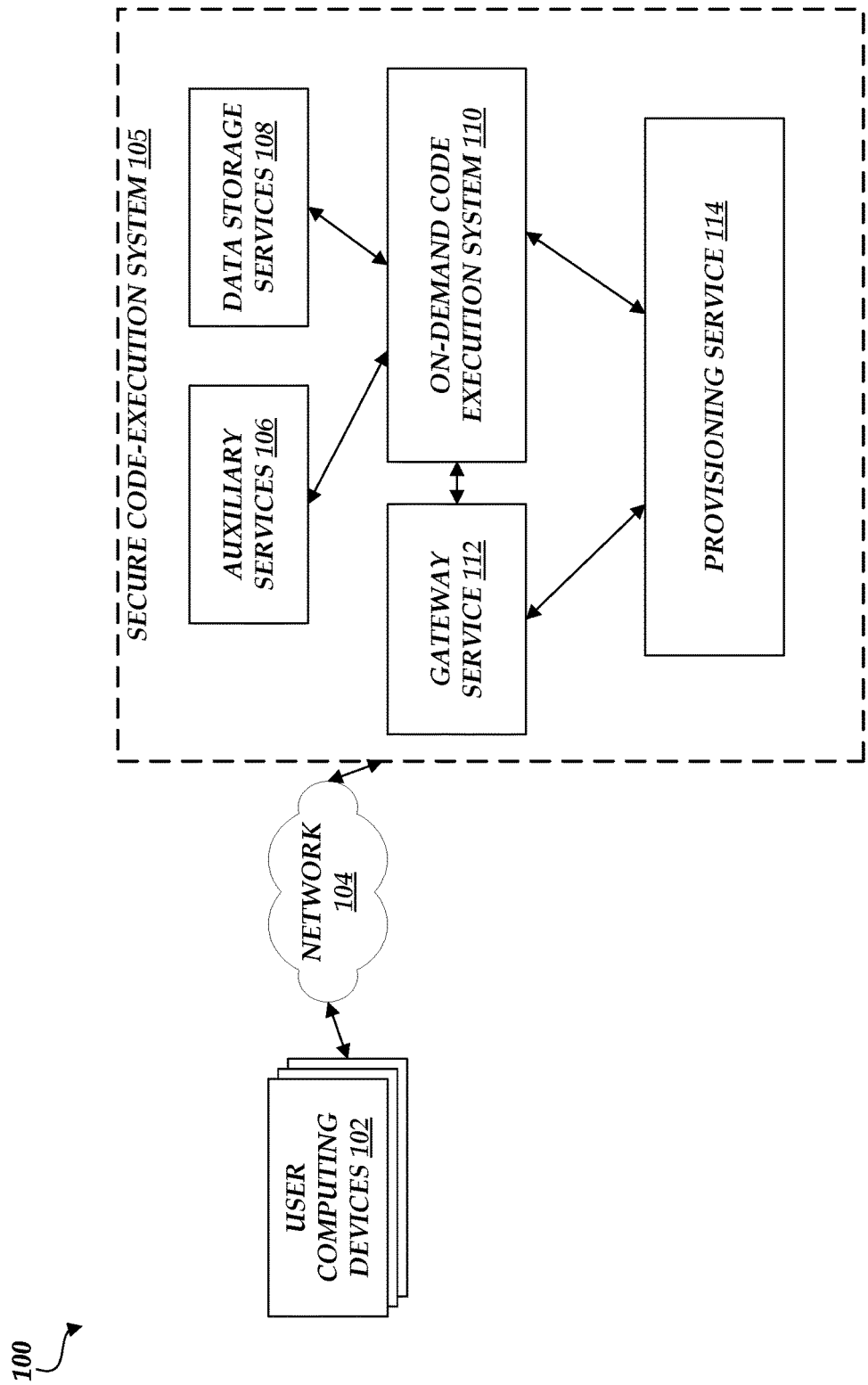
FIG. 1A is a block diagram depicting an illustrative network environment for implementing a secure code-execution system.

Aspects of the present disclosure relate to execution of processes in a "serverless" or "cloud computing" environment. Aspects of the present disclosure also relate to an on-demand code execution system. The on-demand code execution system enables rapid execution of code, which may be supplied by users of the on-demand code execution system that may be implemented in a serverless environment. The terms "serverless" or "cloud computing" environment, as used herein, refer to environments in which responsibility for managing generation, configuration, and state of an underlying execution environment is abstracted away from a user. For example, the user need not create the execution environment, install an operating system, or manage a state of the environment in order to execute desired code in the environment. In an existing on-demand code execution system, a single execution environment can be responsible for handling many requests, across many users. This can introduce security vulnerabilities, such as, for example: (i) malicious requests that have the ability to corrupt the state or code of the server to make it perform unexpected actions; or (ii) allowing malicious attackers to discern sensitive information from reusable execution environments.

As described above, in some existing virtual machine systems, a snapshot of a virtual machine can be created and the virtual machine can be restored from the snapshot. For example, the snapshot can be an image of the current state of the virtual machine. However, the snapshot process in existing virtual machine systems can be relatively slow, such as by taking several seconds to create and/or restore from a snapshot.

Generally described, aspects of the present disclosure are directed to an execution environment for an on-demand code execution system that is configured to handle a single request (or session) for a single user. Once the session or request is complete, the execution environment can be reset, such as by having the hardware processor state, memory, and storage reset. In particular, prior to the execution of code, state of the execution environment of the host computing device can be saved, such as state related to the hardware processor(s), memory, and/or storage. Moreover, during execution of the code instructions, intermediate state can be gathered. Following the execution of the code, the execution environment can be reset based on the saved state related to the hardware processor(s), memory, and/or storage and the intermediate state. A subsequent code execution can securely occur in the execution environment and the execution environment can be reset yet again. Accordingly, the execution environments can be reused and reset over multiple code executions in an efficient manner.

As used herein, in addition to its ordinary and customary meaning, an "execution environment" can refer to a logical unit created on a host computing device, such as within a virtual machine instance, that uses the resources available on that instance or device. Based on request to execute user code, a new execution environment may be created or refreshed to handle the execution of the user code. Each execution environment can provide a degree of isolation from other execution environments. For example, each execution environment may provide a file system isolated from other file systems on the device, and code executing in the execution environment may have limited or no access to other file systems or memory space associated with code executing outside of the execution environment. An example execution environment can be a container within a virtual machine instance.

The systems and methods described herein may improve security within serverless environments, such as within on-demand code execution systems. As described herein, in some existing on-demand code execution systems, a single execution environment can be responsible for handling many requests, across many users. By resetting an execution environment after each request or session, security issues can be addressed, such as side-channel attacks and persistent malware. As used herein, the term "side-channel attack" generally refers to a security exploit that involves collecting information about what a computing device does when executing code and using that information to reverse engineer the device. The term "side-channel attack" can also generally refer to a situation with a multi-tenanted environment where multiple workers are running at the same time and a worker is able to infer information about other workloads that currently physically co-located on the same computing device. Thus, the systems and methods described herein can improve over existing serverless technologies.

The systems and methods described herein may improve virtualization technologies. As described above, the snapshot process in existing virtual machine systems can be relatively slow, such as by taking several seconds to create and/or restore from a snapshot. For example, creating a snapshot in existing virtual machine systems can require creating an image of the entire contents of the processor, memory, and storage state. Likewise, restoring from a snapshot can require loading the saved image. Creating the snapshot and/or restoring from the snapshot can take many seconds. Accordingly, instead of exclusively relying on existing snapshot technologies, the presently described techniques can save and/or restore processor, memory, and storage state in an execution environment in a much more lightweight and faster manner than existing virtual machine technologies.

Turning to FIG. 1A, an illustrative network environment 100 is shown in which a secure code-execution system 105 may rapidly provision execution environments for user-code execution. The network environment 100 may include user computing devices 102, a network 104, and a secure code-execution system 105. The secure code-execution system 105 may include a gateway service 112, a provisioning service 114, a credential service, an on-demand code execution system 110, auxiliary services 106, and data storage services 108. The constituents of the network environment 100 may be in communication with each other either locally or over the network 104. The user computing devices 102 may include any computing device capable of communicating with the secure code-execution system over the network 104, such as a client computing device. Example computing devices include a laptop or tablet computer, personal computer, personal digital assistant (PDA), hybrid PDA/mobile phone, mobile phone, and/or a smartphone.

While certain constituents of the network environment 100 are depicted as being in communication with one another, in some embodiments, any constituent of the network environment 100 can communicate with any other constituent of the network environment 100. For example, the gateway service 112 can communicate with any constituent of the network environment 100; however, not all of these communication lines are depicted in FIG. 1A.

A user computing device 102 can transmit a request to execute code instructions to the secure code-execution system 105. The gateway service 112 can receive the request. In response to receiving the request, the provisioning service 114 can cause a new execution environment to be instantiated in the on-demand code execution system 110. If an execution environment already exists, the provisioning service 114 can cause the execution environment to be reset in the on-demand code execution system 110. In some embodiments, if an execution environment is used for a session with multiple requests, then the execution environment may already exist and be reused. User-code can be executed on the on-demand code execution system 110 within the execution environment. For example, the executed code on the on-demand code execution system 110 can communicate with the auxiliary services 106 or data storage services 108 to carry out the task.

Moreover, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of computing capacity (e.g., execution environment, containers, instances, etc., which are described in greater detail below) based on the code execution request, and execute the code using the computing capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The network-based data storage services 108 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage.

The network 104 may be any wired network, wireless network, or combination thereof. In addition, the network 104 may be a personal area network, local area network, wide area network, cable network, satellite network, cellular telephone network, or combination thereof. In addition, the network 104 may be an over-the-air broadcast network (e.g., for radio or television) or a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The user computing devices 102 and the secure code-execution system 105 may each be embodied in one or more devices. For example, the user computing devices 102 and the secure code-execution system 105 may include a network interface, memory, hardware processor, and non-transitory computer-readable medium drive, all of which may communicate with each other by way of a communication bus. The network interface may provide connectivity over the network 104 and/or other networks or computer systems. The hardware processor may communicate to and from memory containing program instructions that the hardware processor executes in order to operate the user computing devices 102 and the secure code-execution system 105. The memory generally includes RAM, ROM, and/or other persistent and/or auxiliary non-transitory computer-readable storage media.

Additionally, in some embodiments, the secure code-execution system 105 components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 1B:
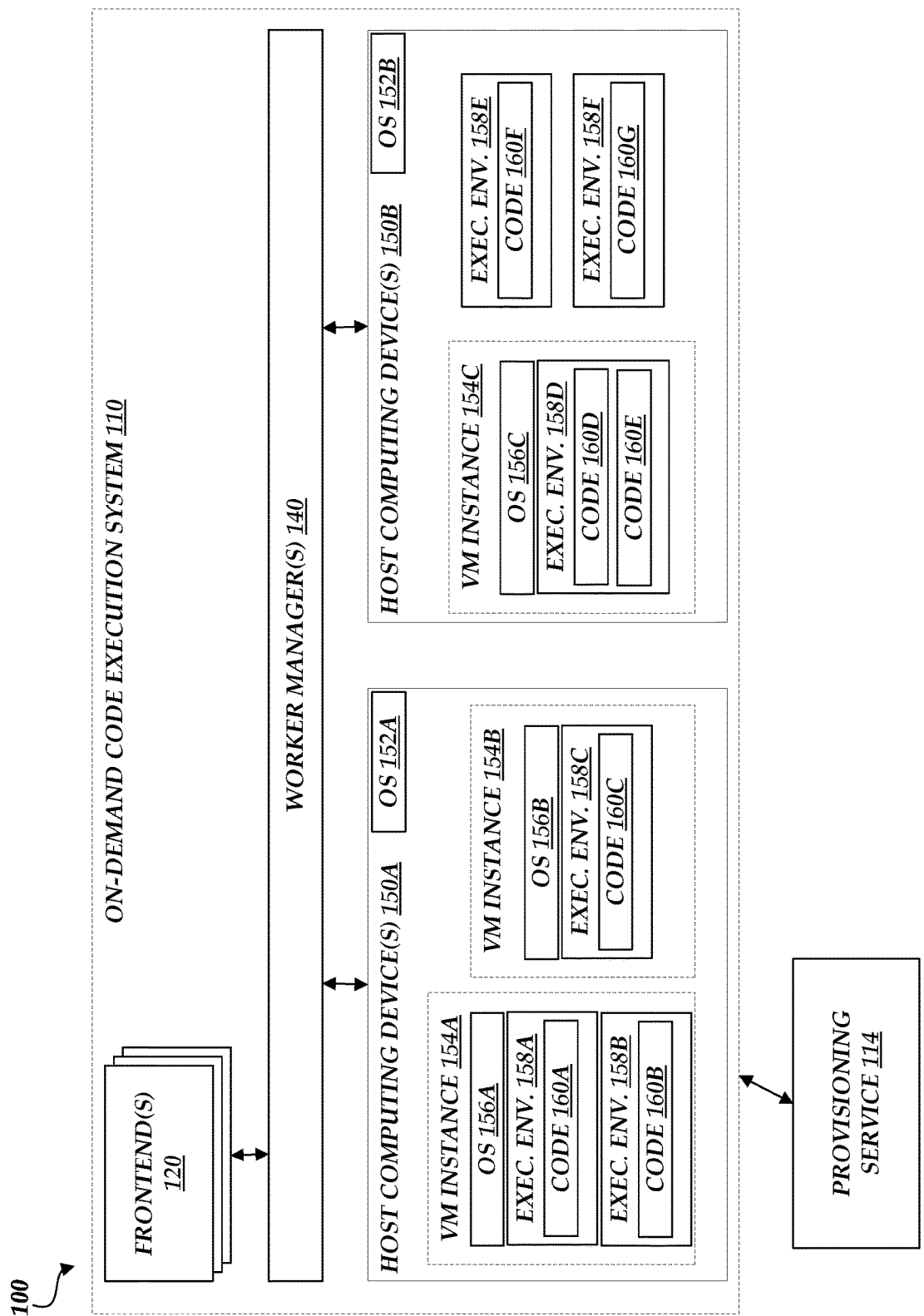
FIG. 1B is a block diagram depicting an illustrative environment in which an on-demand code execution system can execute tasks corresponding to code, which may be submitted by users of the on-demand code execution system.

Turning to FIG. 1B, the on-demand code execution system 110 is depicted as operating in a distributed computing environment including several computer systems that are interconnected using one or more computer networks (not shown in FIG. 1B). The on-demand code execution system 110 could also operate within a computing environment having a fewer or greater number of devices than are illustrated in FIG. 1B. Thus, the depiction of the on-demand code execution system 110 in FIG. 1B should be taken as illustrative and not limiting to the present disclosure.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

References to user code as used herein may refer to any program code (e.g., a program, routine, subroutine, thread, etc.) written in a specific program language. In the present disclosure, the terms "code," "code instructions," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written in programming languages, such as, but not limited to, JavaScript, Java, Python, or Ruby. Tasks may be "triggered" for execution on the on-demand code execution system 110 in a variety of manners. In embodiments, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

To manage requests for code execution, the frontend 120 can include an execution queue (not shown in FIG. 1B), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

To execute tasks, the on-demand code execution system 110 includes one or more worker managers 140 that manage the instances used for servicing incoming calls to execute tasks. In the example illustrated in FIG. 1B, each worker manager 140 manages an active pool of virtual machine instances 154A-154C, which are currently assigned to one or more users and are implemented by one or more physical host computing devices 150A-150B. The physical host computing devices 150A-150B and the virtual machine instances 154A-154C may further implement one or more execution environments 158A-158F, which may contain and execute one or more user-submitted code instructions 160A-160G. As described herein, execution environments can be logical units created within a virtual machine instance, or on a host computing device, using the resources available on that instance or device. For example, each worker manager 140 may, based on information specified in a call to execute a task, create a new execution environment or locate an existing execution environment 158A-158F and assign the execution environment to handle the execution of the task. Each execution environment may correspond to an execution environment for the task, providing at least some isolation from other execution environments. For example, each execution environment may provide a file system isolated from other file systems on the device, and code executing in the execution environment may have limited or no access to other file systems or memory space associated with code executing outside of the execution environment. As described herein, the provisioning service 114 and/or the host computing devices 150A, 150B can create, manage, and/or reset the execution environments 158A-158F.

The execution environments 156A-156F, virtual machine instances 154A-154C, and host computing devices 150A-150B may further include language runtimes, code libraries, or other supporting functions (not depicted in FIG. 1B) that facilitate execution of user-submitted code 160A-160G. The physical computing devices 150A-150B and the virtual machine instances 154A-154C may further include operating systems 152A-152B and 156A-156C. In various embodiments, operating systems 152A-152B and 156A-156C may be the same operating system, variants of the same operating system, different operating systems, or combinations thereof.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of host computing devices 150A-150B, virtual machine instances 154A-154C, and execution environments 158A-158F may be used to facilitate execution of user submitted code 160A-160G. In the illustrated example, the host computing device 150A implements two virtual machine instances 154A and 154B. Virtual machine instance 154A, in turn, implements two execution environments 158A and 158B, which contain user-submitted code 160A and 160B respectively. Virtual machine instance 154B implements a single execution environment 158C, which contains user-submitted code 160C. The host computing device 150B further implements a virtual machine instance 154C and directly implements execution environments 158E and 158F, which contain user-submitted code 160F and 160G. The virtual machine instance 154C, in turn, implements the execution environment 158D, which contains user-submitted code instructions 160D and 160E. It will be understood that these embodiments are illustrated for purposes of example, and that many other embodiments are within the scope of the present disclosure.

Figure 2:
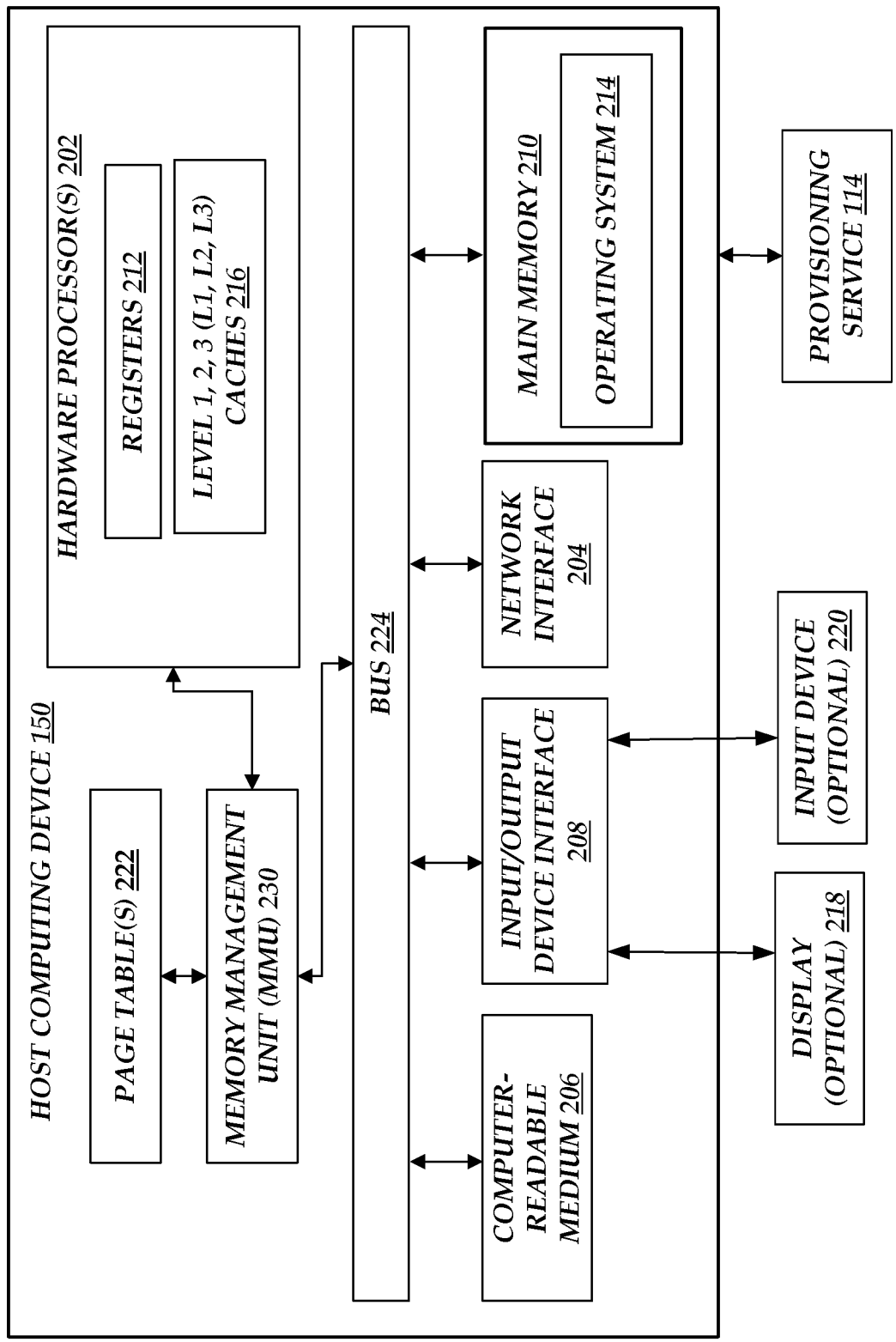
FIG. 2 depicts a general architecture of a host computing device that is depicted in FIG. 1B.

FIG. 2 is a schematic diagram of an illustrative host computing device 150 that can be used in the environment 100 in FIG. 1A. The host computing device 150 includes an arrangement of computer hardware and software components that may be used to rapidly provision an execution environment. While the general architecture of the host computing device 150 is shown and described with respect to FIG. 2, the general architecture of FIG. 2 can be used to implement other services and/or applications described herein. Those skilled in the art will appreciate that the host computing device 150 may include more (or fewer) components than those shown in FIG. 2. Further, other computing systems described herein may include similar implementation arrangements of computer hardware and software components.

The host computing device 150 may include a hardware processor 202, a main memory 210, a memory management unit (MMU) 230, a network interface 204, a non-transitory computer-readable medium 206, and an input/output device interface 208, all of which may communicate with one another by way of a communication bus 224. The computer-readable medium 206 can also be referred to herein as a storage device. The main memory 210 and/or the memory management unit 230 can also be referred to herein as a memory device. As illustrated, the host computing device 150 is associated with, or in communication with, an optional display 218 and an optional input device 220. In other embodiments, the display 218 and input device 220 may be included in the user computing devices 102 shown in FIG. 1A. The network interface 204 may provide the host computing device 150 with connectivity to one or more networks or computing systems. The hardware processor 202 may thus receive information and instructions from other computing systems (such as the user computing devices 102) or services via the network 104. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The main memory 210 may contain specifically configured computer program instructions that the hardware processor 202 executes in order to implement one or more embodiments of the host computing device 150. The memory 210 generally includes RAM, ROM and/or other persistent or non-transitory computer-readable storage media. The memory 210 may store an operating system 214 that provides computer program instructions for use by the processing unit 202 in the general administration and operation of the host computing device 150. The memory 210 may further include other information for implementing aspects of the host computing device 150.

The hardware processor(s) 202 can also be referred to as a central processing unit (CPU). The hardware processor(s) 202 can include processor registers 212 and level 1 (L1), level 2 (L2), and level 3 (L3) caches 216. In some embodiments, while not depicted, the processor 202 can include fewer or additional caches (such as an L4 cache). The processor registers 212 may be quickly accessible locations and may hold an instruction, a storage address, or any kind of data (such as a bit sequence or individual characters). The processor caches 216 are hardware caches used by the processor 202 to reduce the average cost to access data from the main memory 210. The memory management unit (MMU) 230 is a computer hardware device that communicates with one or more page tables 222 to map virtual page numbers to physical page numbers in the main memory 210. Thus, the MMU 230 can perform the translation of virtual memory addresses to physical addresses.

Figure 3A:
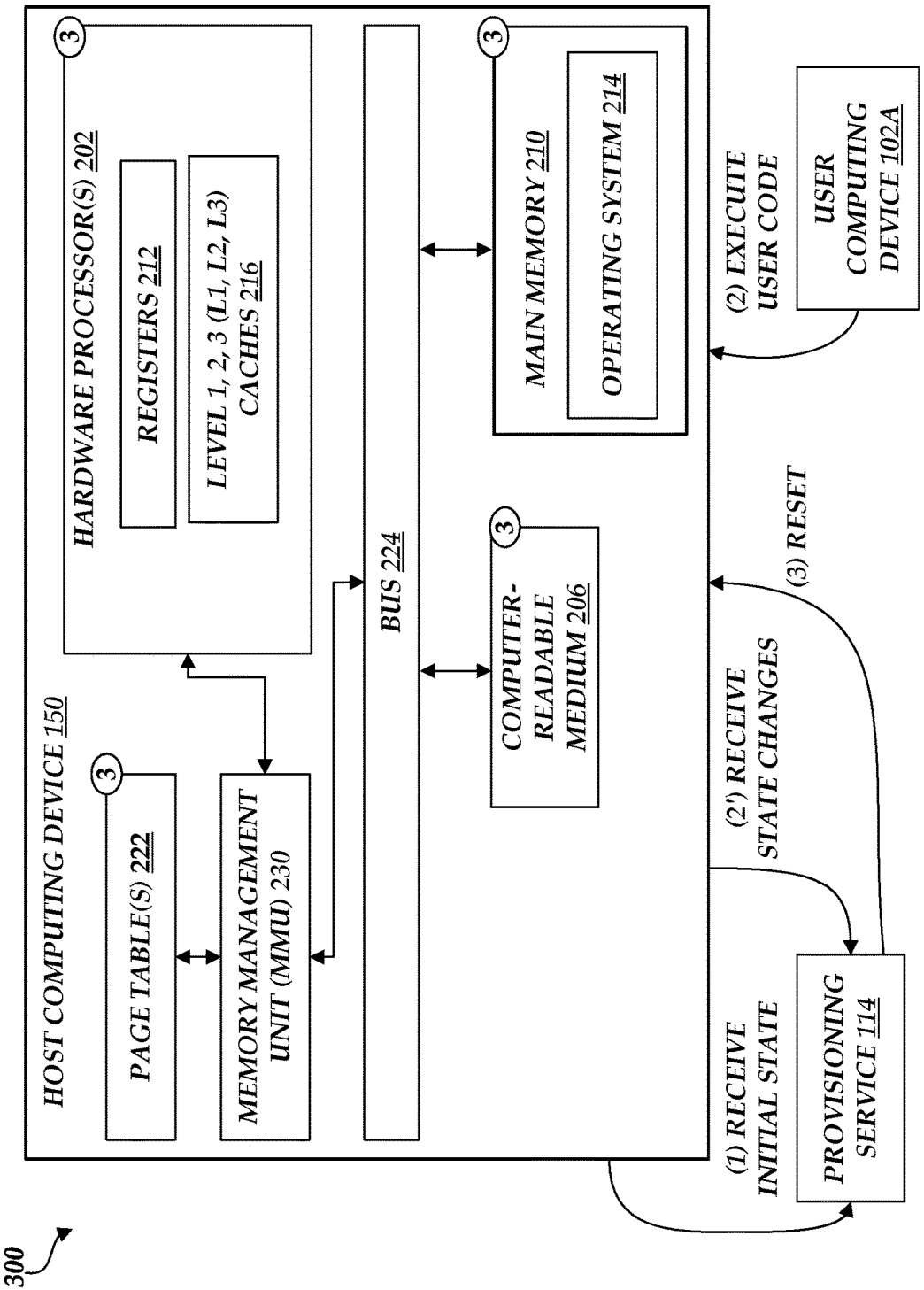
FIGS. 3A-3B are flow diagrams depicting illustrative interactions for provisioning a secure execution environment.

With reference to FIG. 3A, illustrative interactions are depicted for provisioning secure execution environments. The environment 300 of FIG. 3A can be similar to the environment 100 of FIG. 1A or 1B. For example, the user computing device 102A of FIG. 3A can be a computing device of user computing devices 102 of FIG. 1A. Similarly, the host computing device 150 of FIG. 3A can be similar to the host computing device 150 of FIG. 2. However, for ease of discussion, some components of the related figures (such as FIG. 1A, 1B, or 2) may be omitted from being depicted in the environment 300 of FIG. 3A. The depicted interactions in FIG. 3A are example interactions. Moreover, additional example interactions are described in greater detail below with respect to FIG. 3B. Other interactions (not illustrated) may be possible in accordance with the present disclosure in other embodiments. Similar to the communication depictions of FIG. 1A, not every possible communication may be depicted in FIG. 3A.

The interactions of FIG. 3A begin at step one (1), where the provisioning service 114 can receive state from the host computing device 150. Prior to invocation of user code on the host computing device 150, state of the execution environment of the host computing device 150 can be received by the provisioning service 114. Example state that can be received can include, but is not limited to, hardware processor state, storage device state, and/or operating system state. The hardware processor state can include state of the hardware processor registers 212. Example storage device state can include image data of the computer-readable medium 206. Example operating system state can include sockets, file descriptors, pipes, and/or queues of the operating system 214. In some embodiments, the base execution environment can be an image, which is initially loaded on the host computing device 150. The image can include state for the hardware processor 202, the computer-readable medium 206, the main memory 210, and/or other components of the host computing device 150.

At step two (2), the user code instructions of the user computing device 102A can be executed in the execution environment on the host computing device 150. In particular, the user code instructions can be executed in the execution environment on a virtual machine instance of the host computing device 150. While not depicted, the host computing device 150 can be one of many computing devices of the on-demand code execution system 110.

At step two-prime (2'), while the user code instructions execute in the execution environment on the host computing device 150, the provisioning service 114 can receive state changes and/or indications of state changes from the host computing device 150. With respect to the main memory 210, if execution of the code caused reads or writes to any memory pages, then the provisioning service 114 can receive an indication that such operations occurred. Similarly, with respect to the computer-readable medium 206, if execution of the code caused reads or writes to any storage unit (e.g., page, block, or segment) of the computer-readable medium 206, then the provisioning service 114 can receive an indication that such operations occurred. Additional details regarding state changes and/or tracking state changes are described in further detail below with respect to FIG. 5.

At step three (3), following completion of the code execution on the host computing device 150, such as within the virtual machine instance, the provisioning service 114 can cause the execution environment on the host computing device 150 to be reset in an efficient manner. As labeled with the numeral three, each of the hardware processor 202, including the registers 212 and the hardware processor caches 216, the computer-readable medium 206, the page tables 222, and/or the main memory 210 can be reset or modified to revert to an initial execution state. For example, the hardware processor 202, including the registers 212, can be reset to the initial hardware processor state received at step one (1). The hardware processor caches 216 (such as L1, L2, L3, etc.) can be flushed. The computer-readable medium 206, can be reset to the initial storage device state received at step one (1). For example, image data can be loaded to reset the computer-readable medium 206. Additionally or alternatively, if a mechanism was used to keep track of changes to the computer-readable medium 206 during the execution at step two-prime (2'), then only the changes to the computer-readable medium 206 may have to be reverted. Similarly, with respect to main memory 210, if a mechanism was used to keep track of accesses or changes to the main memory 210 during the execution at step two-prime (2'), then only the changes to the main memory 210 may have to be reverted. In particular, the page tables 222 can be modified to reset the execution environment. As depicted, components of the host computing device 150, such as the hardware processor 202 (including the registers 212 and/or the hardware processor caches 216), the page tables 222, the computer-readable medium 206, and/or the main memory 210 (including the operating system 214) can be reset at step three (3). Additional details regarding resetting the execution environment are described in further detail below with respect to FIG. 5. Accordingly, the execution environment on the host computing device 150, such as the execution environment on a virtual machine instance of the host computing device 150, can be reset in an efficient manner and can be ready to securely process additional code execution requests.

Figure 3B:
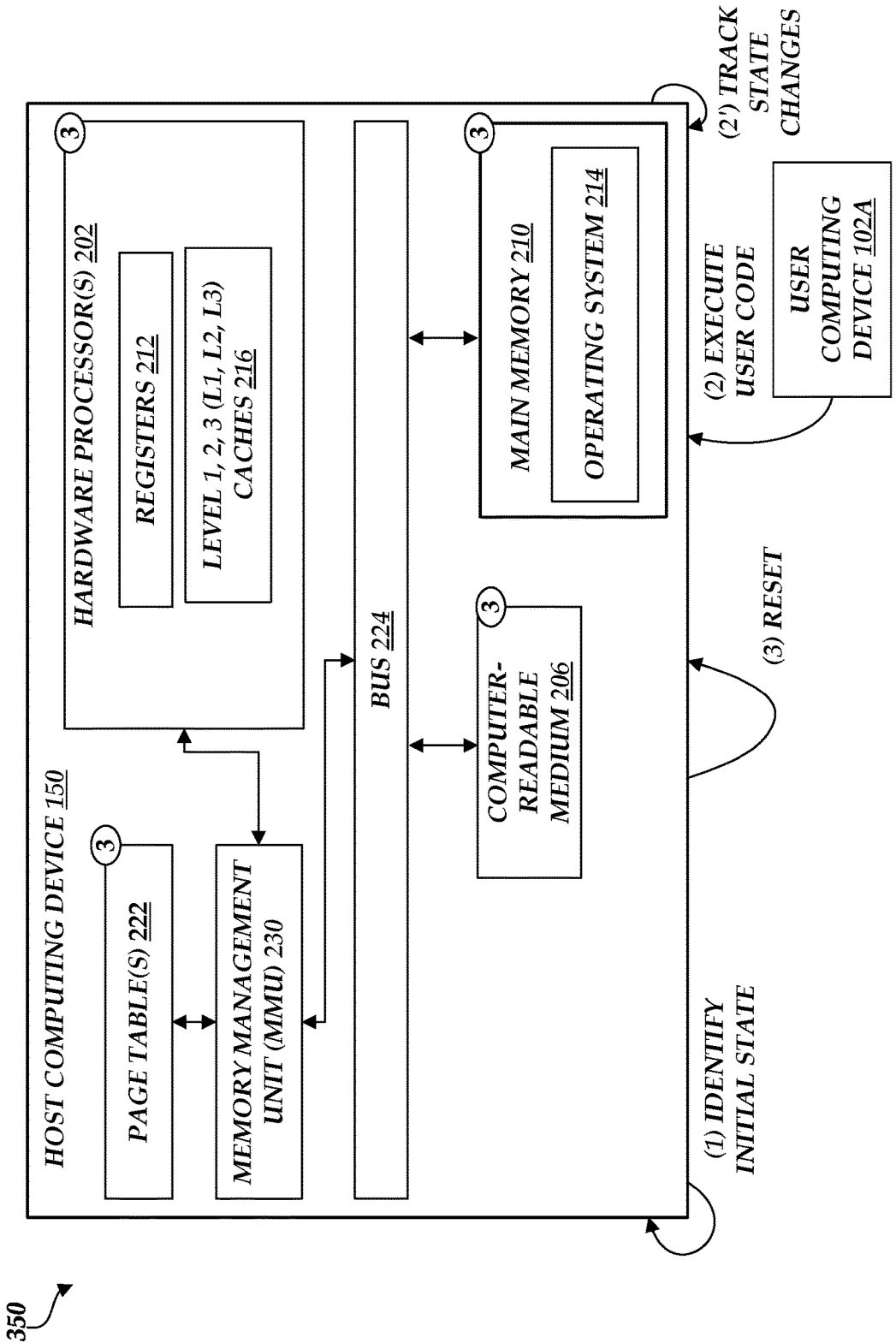

With reference to FIG. 3B, additional illustrative interactions are depicted for provisioning secure execution environments. The environment 350 of FIG. 3B can be similar to the environment 300 of FIG. 3A. For example, the host computing device 150 of FIG. 3B can be similar to the host computing device 150 of FIG. 2 and/or 3A. However, a difference between the environment 350 of FIG. 3B and the environment 300 of FIG. 3A can be that the host computing device 150 of the former environment 350 can reset its execution environment without receiving reset instructions from a provisioning service 114. In particular, the host computing device 150 of FIG. 3B can be configured to identify state, track state, and reset its execution environment following completion of the user code. The depicted interactions in FIG. 3B are example interactions. Other interactions (not illustrated) may be possible in accordance with the present disclosure in other embodiments. Similar to the communication depictions of FIG. 1A, not every possible communication may be depicted in FIG. 3B.

The interactions of FIG. 3B begin at step one (1), where the host computing device 150 can identify its own state. Prior to invocation of user code on the host computing device 150, the host computing device 150 can determine the state of its execution. As described herein, execution environment state can include, but is not limited to, hardware processor state (such as state of the hardware processor registers 212), storage device state (such as page, block, segment, or image data of the computer-readable medium 206), and/or operating system state (such as sockets, file descriptors, pipes, and/or queues of the operating system 214). In some embodiments, the base execution environment can be an image, which is initially loaded on the host computing device 150. The image can include state for the hardware processor 202, the computer-readable medium 206, the main memory 210, and/or other components of the host computing device 150.

At step two (2), the user code instructions of the user computing device 102A can be executed in the execution environment on the host computing device 150. In particular, the user code instructions can be executed in the execution environment on a virtual machine instance of the host computing device 150.

At step two-prime (2'), while the user code instructions execute in the execution environment on the host computing device 150, the host computing device 150 can identify state changes and/or indications of state changes from the host computing device 150. With respect to the main memory 210, if execution of the code caused reads or writes to any memory pages, then the host computing device 150 can identify those operations. Similarly, with respect to the computer-readable medium 206, if execution of the code caused reads or writes to any storage unit (e.g., page, block, or segment) of the computer-readable medium 206, then the host computing device 150 can identify those operations. Additional details regarding identifying state changes (such as tracking those state changes) are described in further detail below with respect to FIG. 5.

At step three (3), following completion of the code execution on the host computing device 150, such as within the virtual machine instance, the host computing device 150 can be configured to efficiently reset the execution environment on the host computing device 150. As labeled with the numeral three, the host computing device 150 can reset or modify each of the hardware processor 202, including the registers 212 and the hardware processor caches 216, the computer-readable medium 206, the page tables 222, and/or the main memory 210 to revert to an initial execution state. For example, as described herein, the host computing device 150 can reset its own hardware processor 202, including the registers 212, to the initial hardware processor state identified at step one (1). The host computing device 150 can further flush the hardware processor caches 216 (such as L1, L2, L3, etc.). The host computing device 150 can reset the computer-readable medium 206 to the initial storage device state identified at step one (1). With respect to main memory 210, if a mechanism was used to keep track of accesses or changes to the main memory 210 during the execution at step two-prime (2'), then only the changes to the main memory 210 may have to be reverted. In particular, the page tables 222 can be modified to reset the execution environment. Additional details regarding resetting the execution environment are described in further detail above and below with respect to FIGS. 3A and 5.

In particular, the hardware processor 202 can cause the computer-readable medium 206, the page tables 222, and/or the main memory 210 to revert to an initial execution state. Moreover, the hardware processor 202 can reset itself. For example, as discussed below, the hardware processors 202 can use the "big.LITTLE" architecture or something similar. Accordingly, one or more of the hardware processors can be responsible for resetting, which can include resetting the other hardware processors as well as the computer-readable medium 206, the page tables 222, and/or the main memory 210.

Figure 4:
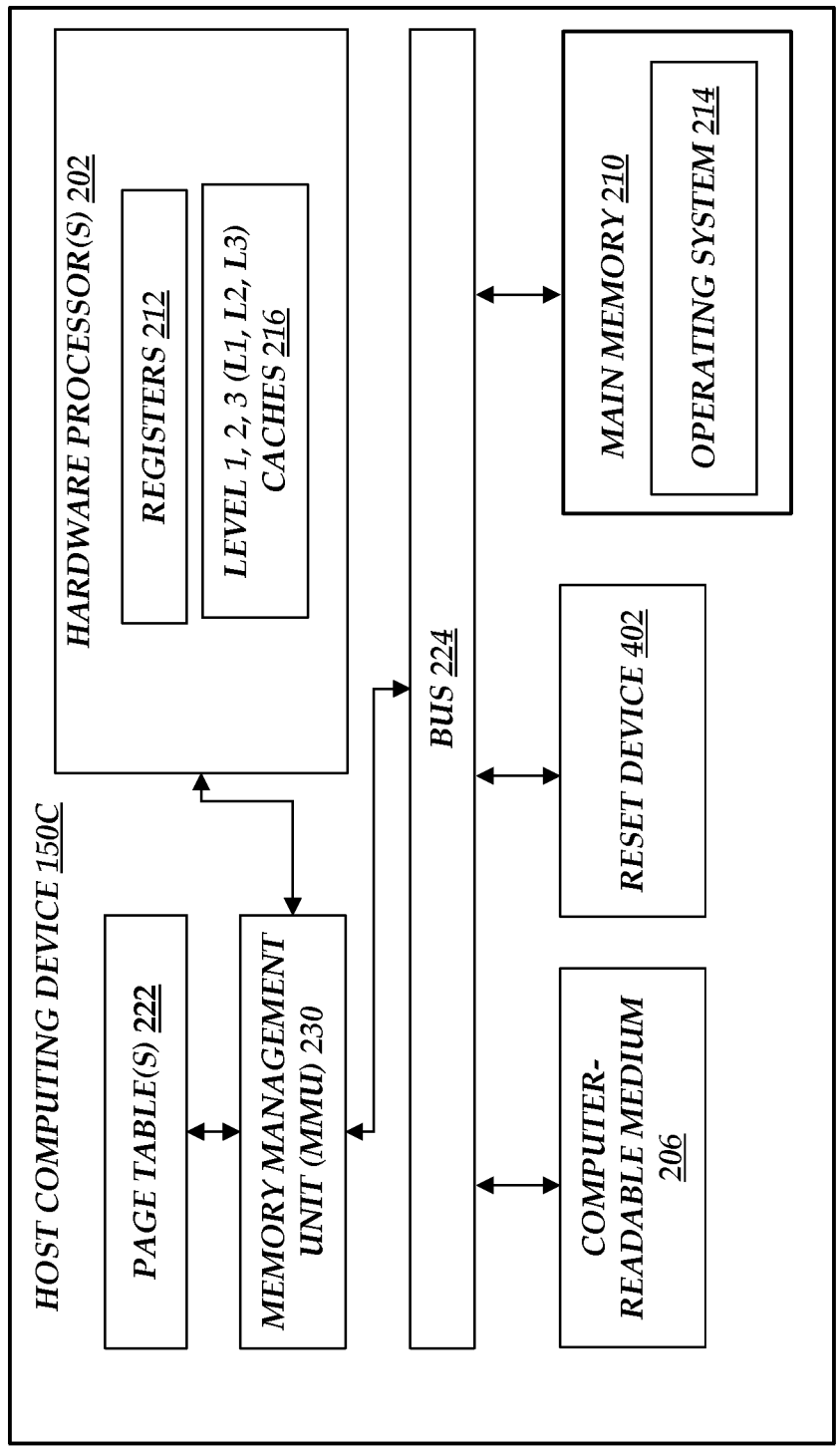
FIG. 4 depicts another architecture for a host computing device.

FIG. 4 depicts another architecture for a host computing device 150C. The host computing device 150C of FIG. 4 can be similar to the host computing device 150 of FIG. 2. However, the host computing device 150C of FIG. 4 can include a reset device 402. The reset device 402 can be hardware on the host computing device 150C that is configured to perform some of the reset operations described herein. For example, instead of the hardware processor 202 resetting its own state or resetting the computer-readable medium 206, and/or the main memory 210, the reset device 402 can be responsible for such operations. The reset device 402 can be special purpose hardware for resetting. Example reset devices 402 can include a card on the bus 224 (such as a Peripheral Component Internet (PCI) card) and/or a complex programmable logic device (CPLD) or a field programmable gate array (FPGA), which can reside on the motherboard of the host computing device 150C.

In other embodiments (not depicted), the host computing device 150C can include multiple hardware processors 202 or cores. In these embodiments, one or more of the hardware processors 202 or cores can be configured for reset-specific tasks, whereas other hardware processors 202 or cores can be responsible for general computing tasks. For example, if the hardware processors 202 use the "big.LITTLE" architecture or something similar, one or more of the hardware processors 202 or cores configured for reset-specific tasks can be the smaller cores, and the remaining hardware processors 202 can be the bigger cores that can be reserved for more complex tasks that resetting.

Figure 5:
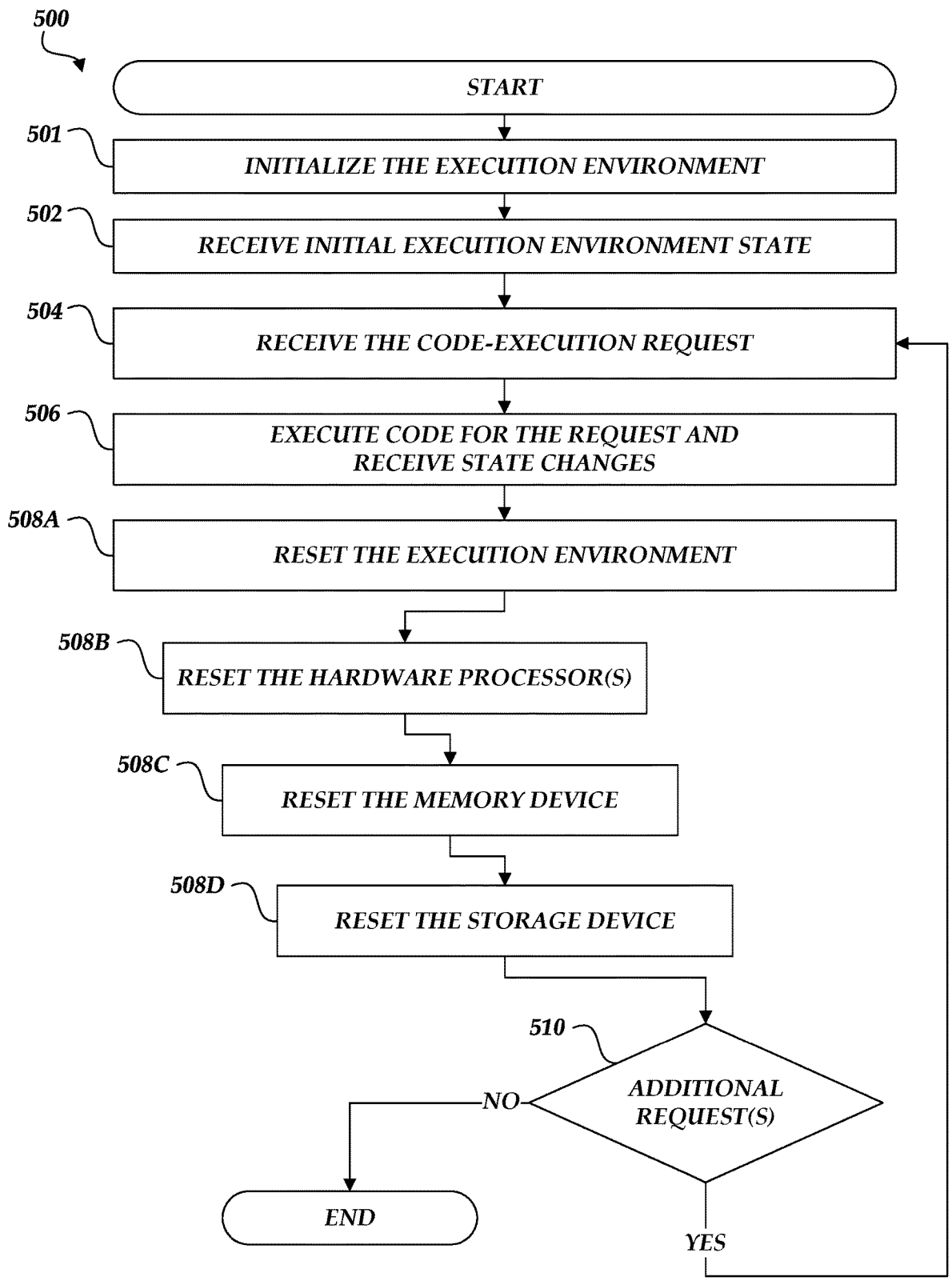
FIG. 5 is a flow chart depicting an example method for securely processing code-execution requests.

FIG. 5 is a flow diagram depicting an example method 500 implemented by the secure code-execution system 105 for securely processing code-execution requests. As described herein, the secure code-execution system 105 may include the provisioning service 114. In some embodiments, the provisioning service 114 and/or the host computing device 150 may implement aspects of the method 500.

At block 501, the execution environment can be initialized. For example, if an execution environment does not exist on the host computing device 150, such as within a virtual machine instance, the provisioning service 114 and/or the host computing device 150 can initially create the execution environment. As described herein, the base execution environment can be an image, which is initially loaded on the host computing device 150. Thus, multiple virtual machine instances and/or host computing devices can initially use and/or share the same base execution environment.

In some embodiments, initialization of the host computing device 150 may be customizable based on the request, session, and/or the user profile associated with the code-execution request. As described herein, the provisioning service 114 may initialize the execution environment to a base execution environment on the virtual machine instance of the host computing device. In addition to the base initialization, the provisioning service 114 may insert customized data for the code instructions into the base execution environment to result in the first execution environment. Example customized data could include a machine learning data model that the code instructions may use. Thus, execution of the code instructions may cause access of the customized data.

At block 502, initial execution environment state can be received. For example, the provisioning service 114 can receive the initial execution environment state from the host computing device 150. In particular, the provisioning service 114 can receive hardware processor state from a hardware processor 202 of the host computing device 150. The hardware processor state can include state from the processor registers 212. The provisioning service 114 can receive storage device state from the computer-readable medium 206 of the host computing device 150. The storage device state can include image data of the computer-readable medium 206. The provisioning service 114 can receive operating system state from the operating system 214 (such as state from a Linux or Unix kernel) of the host computing device 150. As described herein, example operating system state can include sockets, file descriptors, pipes, and/or queues of the operating system 214. The purpose of the initial execution environment state can be to inform what the execution environment should be reset back to following completion of a code execution task on the host computing device 150. In some embodiments, the initial execution environment state can be cached. For example, if a predetermined execution environment is loaded (such as being loaded from an image) onto the host computing device 150, the initial execution environment can be known and pre-cached. Thus, receiving the initial execution environment can include retrieving the state from a cache.

As described herein, in some embodiments, some aspects of the provisioning service 114 can be implemented by the host computing device 150, such as identifying an initial state. For example, the host computing device 150 can maintain the initial execution environment state from the host computing device 150. In some embodiments, the initial execution environment state can be cached if the initial execution environment remains the same across multiple loadings and/or devices.

At block 504, a code-execution request can be received. For example, the gateway service 112 can receive a code-execution request from the user computing device 102A. The request can be processed in part by the provisioning service 114 and/or the on-demand code execution system 110 as described herein.

At block 506, the user code can be executed. For example, user code can be executed within the execution environment of the host computing device 150. More specifically, the code instructions can be caused to be executed in an execution environment on a virtual machine instance on the host computing device 150 in the on-demand code execution system 110. The user code instructions can execute the requested task. A result of the user code processing or a message associated with the result, such as a success message, can be transmitted to the user computing device 102A.

Also at block 506, while the user code instructions execute in the execution environment, state from the host computing device can be maintained and/or receive. For example, the provisioning service 114 can receive state from the host computing device. In particular, the user code instructions execute in the execution environment on the host computing device 150, the state of the host computing device 150 can update. For example, the hardware processor 202 (including the processor registers 212 and/or the processor cache(s) 216) of the host computing device 150 can change in state. The computer-readable medium 206 of the host computing device 150 can change in state, such as blocks, bits, segments, or pages of the computer-readable medium 206 being updated in response to read, writes, deletes, or updates to the device 206. The main memory 210 and/or associated components (such as the page table(s) 222) of the host computing device 150 can change in state. The provisioning service 114 can receive state changes and/or indications of state changes from the host computing device 150. Much like the purpose of receiving the initial state of the execution environment, the purpose of receiving changes to the execution environment can be to further inform how the execution environment can be reset in an efficient manner following completion of a code execution task on the host computing device 150. In some embodiments, some aspects of the provisioning service 114 can be implemented by the host computing device 150, such as maintaining state while the user code executes. In particular, while the user code executes, the state (such as the memory device state and/or the storage device state described below) can be internally maintained without necessarily communicating with the provisioning service 114.

While the code instructions execute, the provisioning service 114 can receive memory device state from a memory device, such as the main memory 210, of the host computing device. Example memory device state can include an indication that a memory page was accessed and/or modified. For example, if execution of the code caused reads or writes to any memory pages, then the provisioning service 114 can receive an indication that such operations occurred. In particular, while the code instructions execute, the host computing device 150 can be caused to record, in the host computing device, the memory device state that indicates a memory page that was accessed or modified. Recording, in the host computing device, the memory device state that indicates the memory page that was accessed can include generating a duplicate memory page of the memory page that was accessed, which can also be referred to as copy-on-access. As described herein, copy-on-access can advantageously prevent some side-channel attacks because it can prevent subsequently executing code instructions from determining what memory pages were previously accessed, which is information that some malicious actors can use. Similarly, recording, in the host computing device, the memory device state that indicates the memory page that was modified can include generating a duplicate memory page of the memory page that was modified, which can also be referred to as copy-on-write. The provisioning service 114 and/or the host computing device 150 can track every first access to a page. In a Linux environment, the provisioning service 114 and/or the host computing device 150 can use userfaultfd to track access to memory pages.

In some embodiments, while the code instructions execute, the host computing device 150 can create a bit map that indicates what has been accessed or modified and what has not been accessed or modified. Example memory device state can include an indication that a memory page was accessed and/or modified as stored in the bit map and the memory device state can be received by the provisioning service 114. In some embodiments, the bit map can be custom-created for resetting purposes in the on-demand code execution system 110. Additionally or alternatively, the bit map can be an existing one (such as a dirty bit map used by the Linux kernel), which can be used for resetting purposes. The bit map can include, for example, indications for at least a first clean memory page and a second memory page that has been accessed or modified. In some of these embodiments, clean memory pages can be stored on disk and used for reverting the dirty memory pages, which is described in further detail below at block 508C along with other mechanisms for revering the dirty memory pages. As described herein, the host computing device 150 can maintain a bit map that indicates what has and has not been accessed or modified without necessarily communicating with the provisioning service 114.

While the code instructions execute, the provisioning service 114 can receive storage device state from the computer-readable medium 206 of the host computing device. In particular, if execution of the code caused reads or writes to any storage unit (e.g., a page, block, or segment) of the computer-readable medium 206, then the provisioning service 114 can receive an indication that such operations occurred. The host computing device 150 can use copy-on-access and/or copy-on-write to keep track of storage units (e.g., a page, block, or segment) of the computer-readable medium 206 that has been accessed or modified, respectively. As described herein, the host computing device 150 can maintain the storage device state without necessarily communicating with the provisioning service 114.

In some embodiments, the secure code-execution system 105 may allow some state to persist beyond a request or a session. Such features may have some security risks; however, it may be advantageous to efficiently build up a cache or amortize the cost of certain actions such as creating a connection. A storage device, such as the computer-readable medium 206, or a memory device, such as the main memory 210, of host computing device 150 may include a trusted area for storing data. Thus, while the code instructions execute, data may be stored in a trusted storage sector of the storage device and/or a trusted memory area of the memory device. The provisioning service 114 may receive an indication, such as storage device state or memory device state, that data was stored in the trusted storage sector or the trusted memory area.

At block 508A, the execution environment can be reset. Following completion of the code instructions, the execution environment on the virtual machine instance of the host computing device 150 can be reset. In some embodiments, the host computing device 150 can notify the provisioning service 114 when execution of the user code instructions completed. Additionally or alternatively, the provisioning service 114 can determine when the execution of the code instructions have completed. The provisioning service 114 can reset the execution environment the execution environment on the virtual machine instance of the host computing device 150. As described herein, in some embodiments, the host computing device 150 can reset itself without necessarily communicating with the provisioning service 114. As part of resetting the execution environment at this block 508A, at the following blocks 508B, 508C, 508D the hardware processor 202, the computer-readable medium 206, and/or a memory device of the host computing device 150, respectively, can be reset. The blocks 508B, 508C, 508D for resetting the hardware processor 202, the computer-readable medium 206, and/or a memory device of the host computing device 150 can occur in a different order than depicted, can occur at least in part concurrently, and/or not all of the blocks 508B, 508C, 508D may be performed depending on the embodiment. The host computing device 150 can notify the provisioning service 114 when the reset has been completed.

As described herein, some aspects of the provisioning service 114 can be implemented by the host computing device 150, such resetting the execution environment. In particular, the host computing device can perform the below block(s) 508B, 508C, 508D to reset the execution environment without necessarily communicating with the provisioning service 114. As mentioned, the host computing device 150 can be configured to reset itself.

At block 508B, the hardware processor(s) 202 can be reset. In particular, the provisioning service 114 can transmit reset instructions to the hardware processor 202 of the host computing device 150. The reset instructions can be configured to cause the hardware processor 202 of the host computing device 150 to revert to the hardware processor state that was received at the previous block 502. Reverting the hardware processor 202 to the previous hardware processor state can include reverting the processor registers 212 to some of the previous hardware processor state. As described herein, the host computing device 150 can transmit reset instructions to the hardware processor 202 without necessarily communicating with the provisioning service 114. For example, the reset device 402 can transmit the reset instructions.

In some embodiments, the reset instructions can be further configured to flush the processor cache 216 (such as L1, L2, L3, etc.) of the hardware processor 202. Flushing the processor cache 202 can further prevent side-channel attacks, such as the Spectre class of side-channel attacks that exploit branch prediction and speculative execution on modern hardware processors to read memory, possibly bypassing access controls. While it may not be strictly necessary to flush the cache to execute subsequent code instructions, if the processor cache(s) 216 are not flushed, then it may be possible for sensitive processor data to be captured by or leaked to subsequent malicious actors, such as by inspecting branch predictors or caches 216 of the hardware processor 202. In some embodiments, the processor cache(s) 216 may be flushed and/or other state may be reset where two parallel invocations are occurring on the host computing device 150 (such as multiple, simultaneous virtual machine instances on the same host computing device) and the host computing device 150 is switching between the invocations at different time slices.

At block 508C, a memory device can be reset. In particular, the provisioning service 114 can cause the memory device of the host computing device 150 to revert to an initial state based at least in part on the memory device state received at the previous block 502. For example, the provisioning service 114 can receiving indications when a memory page in the main memory 210 was accessed or modified during the code execution. In the copy-on-access or copy-on-write cases, resetting the main memory 210 can be accomplished by discarding the duplicate memory page that was either accessed or modified. By discarding the duplicate memory page, the initial memory page is loaded and available in the main memory 210, thereby revering the main memory 210 to an initial state. As described herein, the host computing device 150 can reset a memory device without necessarily communicating with the provisioning service 114.

In some embodiments where the host computing device 150 keeps track of what memory pages have been modified or accessed in a bit map, the provisioning service 114 can cause the memory device of the host computing device 150 to revert to an initial state based at least in part on the memory device state received at the previous block 502. For example, the provisioning service 114 can identify, using the bit map, which memory pages are clean and which memory pages are dirty, such as the first clean memory page and the second memory page that has been accessed or modified. Since the first memory page is clean, it does not have to be replaced and can be maintained. Conversely, since the second memory page has been accessed or modified, the second memory page can be replaced with a clean one. The clean memory pages can be stored on disk. The received or retrieved clean memory page from disk can be used to replace memory page that has been accessed or modified in the main memory 210. Additionally or alternatively, instead of replacing clean pages, the provisioning service 114 can cause the host computing device 150 modify the page table(s) 222. The provisioning service 114 can modify the page table(s) 222 by changing which logical pages point to which physical pages. However, modifying page table(s) 222 may be dependent hardware processor 202 and/or even the version of the hardware processor 202. Accordingly, another solution for modifying page tables in a Linux kernel environment can include initially using mmap prior to a user code invocation and following the completion of the code instructions, the main memory 210 can be remapped to a clean copy. Maintaining clean copies of memory pages can be done by intercepting writes to those pages and making copies of those pages on disk, which can also be referred to as copy-on-write. Similarly, clean copies of memory pages can be obtained with copy-on-access. In the context of a Linux kernel environment, maintaining clean copies of memory pages with copy-on-write or copy-on-access can be accomplished with device mapper and/or the file system and user space (FUSE). As described herein, the host computing device 150 can cause the memory device to revert to an initial state without necessarily communicating with the provisioning service 114. For example, the host computing device 150 can replace memory pages and/or modify the page table(s) 222 without receiving instructions from the provisioning service 114.

At block 508D, the computer-readable medium 206 can be reset. In particular, in some embodiments, the provisioning service 114 can cause the computer-readable medium 206 to be reverted back to the initial storage device state received at the previous block 502. For example, image data can be loaded on the computer-readable medium 206. Additionally or alternatively, if a mechanism was used to keep track of changes to the computer-readable medium 206 during the execution, then only the changes to the computer-readable medium 206 may have to be reverted, which could be accomplished with copy-on-access or copy-on-write methods. Thus, instead of storing entire snapshots of storage devices, the provision service 114 need only store or cause to be stored the incremental changes to the storage device. As described herein, the host computing device 150 can cause the computer-readable medium 206 to be reverted back to the initial storage device state without necessarily communicating with the provisioning service 114.

In some embodiments, at block 508A additional components can be reset in the execution environment. For example, the operating system 214 or portions thereof (such as sockets, file descriptors, pipes, and/or queues) can be reset to an initial state. As another example, additional physical components or peripherals can be reset to an initial state. Example additional peripherals to be reset can include a graphics processing unit (GPU), which may have state, registers, and/or caches to be cleared and/or reset as well.

In some embodiments, as described herein, the host computing device 150 can include a reset device 402. The reset device 402 can include a processor, which can be configured to transmit reset instructions to the hardware processor 202. As described herein, example reset devices 402 can include a card on the bus 224 (such as a Peripheral Component Internet (PCI) card) and/or a complex programmable logic device (CPLD) or a field programmable gate array (FPGA), which can reside on the motherboard of the host computing device 150. The reset device 402 residing on the host computing device 150 can be configured with specific reset instructions to reset a storage device and/or the main memory 210. A storage device, the main memory 210, the hardware processor 202, and/or components thereof may be configured to power off and on to revert to at least a portion of an initial state. Some devices may require a minimum period of time to be powered off to reset.

In some embodiments, as described herein, the secure code-execution system 105 may allow some state to persist in a trusted storage sector of the storage device and/or a trusted memory area of the memory device. When the reset occurs for the storage device and/or the memory device of the host computing device 150, the trusted storage sector and/or the trusted memory area may be maintained and not reset. Thus, during a second invocation of code instructions in the same execution environment, the data stored in the trusted storage sector and/or the trusted memory area may be available to a subsequent request or session. However, in some embodiments, if the second invocation of code instructions in the same execution environment access data in the trusted storage sector and/or the trusted memory area, the provisioning service 114 may receive state indicating that the data was accessed.

Following the completion of blocks 508A, 508B, 508C, 508D, the execution environment has been reset and is ready to accept additional code execution requests in an efficient manner. At block 510, additional requests can be processed.

For example, a second code execution request can be processed that can result in execution of the previous blocks 504, 506, and/or 508A, 508B, 508C, 508D. In particular, first code instructions could be received from a first user computing device. The secure code-execution system 105 can receive, from a second user computing device different from the first user computing device, second code instructions. As described herein, after processing the first code instructions and resetting the execution environment, the provisioning service 114 can cause the second code instructions to securely execute in the execution environment that has been reset on the virtual machine instance of the host computing device.

Figure 6:
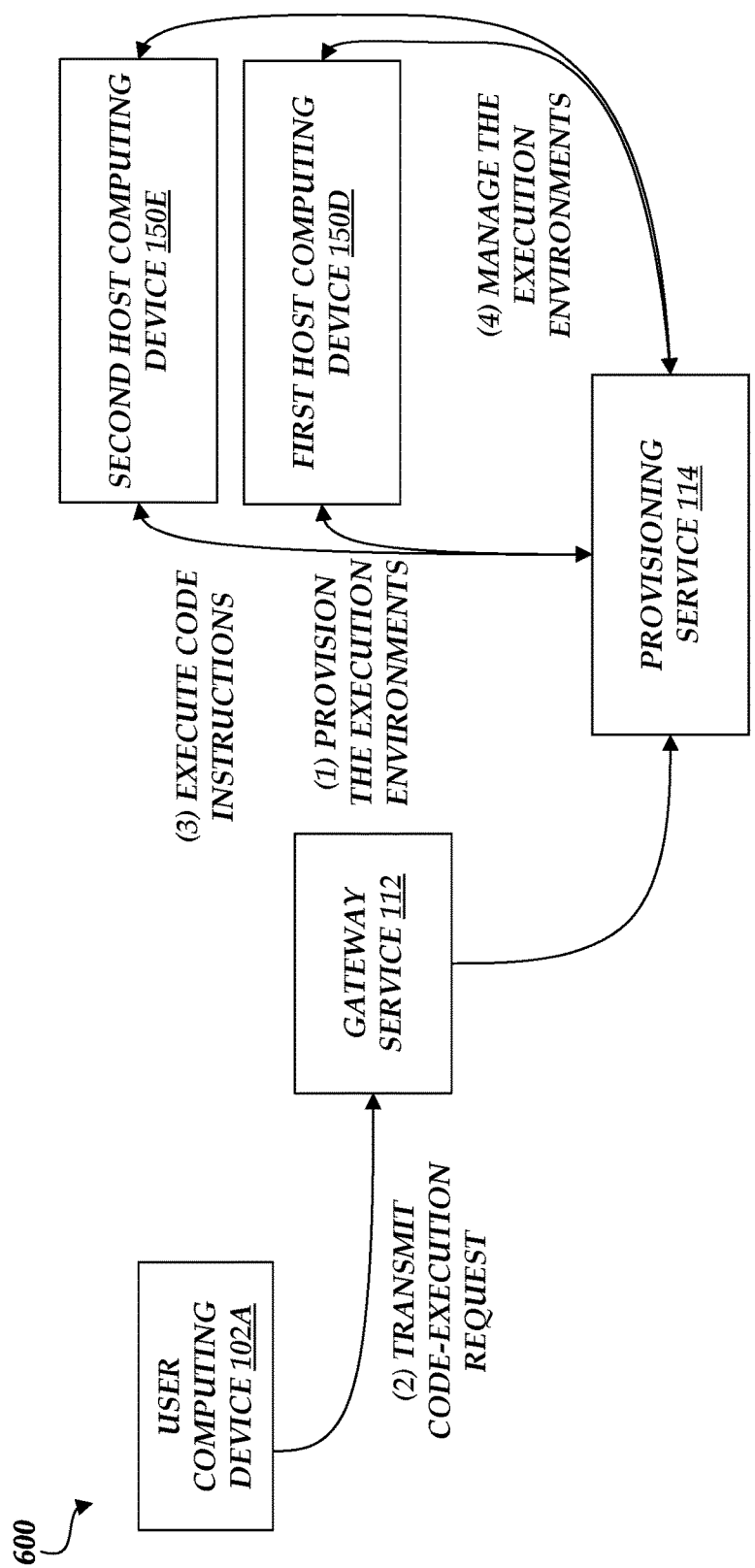
FIG. 6 is a flow diagram depicting illustrative interactions for provisioning multiple secure execution environments.

With reference to FIG. 6, illustrative interactions are depicted for provisioning secure execution environments. The environment 600 of FIG. 6 can be similar to the environment 100 of FIG. 1A or 1B. For example, the user computing device 102A of FIG. 6 can be a computing device of user computing devices 102 of FIG. 1A. Similarly, the host computing device 150 of FIG. 6 can be similar to the host computing device 150 of FIG. 2. However, for ease of discussion, some components of the related figures (such as FIG. 1A, 1B, or 2) may be omitted from being depicted in the environment 600 of FIG. 6. The depicted interactions in FIG. 6 are example interactions. Other interactions (not illustrated) may be possible in accordance with the present disclosure in other embodiments. Similar to the communication depictions of FIG. 1A, not every possible communication may be depicted in FIG. 6.

The interactions of FIG. 6 begin at step one (1), where the provisioning service 114 can provision multiple execution environments on different host computing devices, such as a first host computing device 150D and a second host computing device 150E. Example provisioning can include initially creating the execution environment from a base image. The initial execution environment state can be received from one or more of the first host computing device 150D and the second host computing device 150E. Additional details regarding creating the execution environment and/or receiving the environment state are described above with respect to FIGS. 3A and 5. As described herein, the on-demand code execution system 110 can include many host computing devices. The interactions of FIG. 6 can relate to migrations of code executions and/or environment state between the host computing devices, such as the first host computing device 150D and the second host computing device 150E.

At step two (2), the user computing device 102A can submit a code-execution request that can be received by the gateway service 112, which can be forwarded to the provisioning service 114 and/or the host computing devices 150D, 150E. At step three (3), the user code instructions of the user computing device 102A can be executed in the execution environment on at least the first host computing device 150D. For example, in the case of degrading performance, the code instructions can be executed on the first host computing device 150D and eventually can be migrated to the second host computing device 150E. In other cases and/or embodiments, the same code instructions may be executed on the first host computing device 150D and the second host computing device 150E to determine which host device performs executing the code instructions better.

At step four (4), the provisioning service 114 can manage the execution environments of the host computing devices 150D, 150E. Again, in the case of degrading or poor performance by the first host computing device 150D, the provisioning service 114 can receive intermediate execution environment state (such as hardware processor, memory device, and/or storage device state) while the first host computing device 150D executes the code instructions. The provisioning service 114 can pause the execution of the code instructions, which can include pausing the entire virtual machine instance. The provisioning service 114 can transmit the intermediate execution environment state to the second host computing device 150E. The execution environment on the second host computing device 150E can be initialized according to the intermediate execution environment state. The provisioning service 114 can cause the execution of the code instructions to resume on the second host computing device 150E instead of the first host computing device 150D.

Management of the execution environments of the host computing devices 150D, 150E can also include running the code instructions on multiple host computing devices and determining which host device performs better, which can be referred to as AB testing. The provisioning service 114 can gather performance data regarding execution of the code instructions on the first host computing device 150D. Similarly, the provisioning service 114 can gather performance data regarding execution of the code instructions on the second host computing device 150E. Example performance metrics can include processor, memory, and/or storage performance. The provisioning service 114 can compare the performance data from the host computing devices 150D, 150E to determine that relative to one another, one host computing device has a higher performance metric than the other. In response to determining that one host computing device is performing poorer than the other, execution of the code instructions for the host computing device can be cancelled. Cancellation of the execution of code instructions on the host computing device can cause the execution environment for that host to be reset, as described herein.

Figure 7:
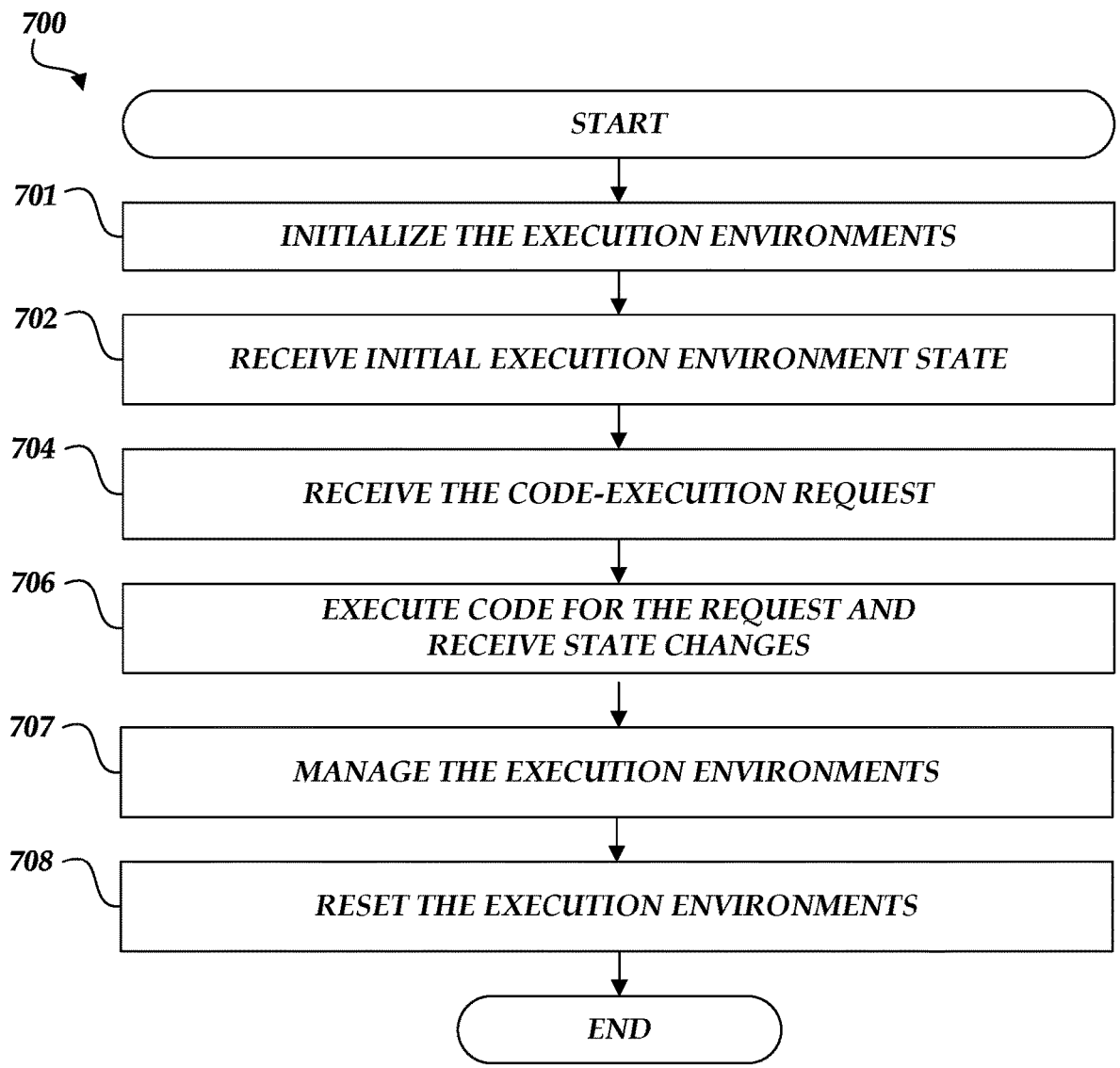
FIG. 7 is a flow chart depicting an example method for securely processing code-execution requests on multiple host computing devices.

FIG. 7 is a flow diagram depicting an example method 700 implemented by the secure code-execution system 105 for securely processing code-execution requests on multiple host computing devices. As described herein, the secure code-execution system 105 may include the provisioning service 114. In some embodiments, the provisioning service 114 may implement aspects of the method 700. In particular, the method 700 may be capable of migrating code execution from a first host computing device to a second host computing device and/or determining which host computing device has better performance to continue processing the code execution.

At block 701, multiple execution environments can be initialized. As described herein, the on-demand code execution system 110 can include many host computing devices. The provisioning service 114 can provision multiple execution environments on different host computing devices. Block 701 of FIG. 7 for initializing execution environments can be similar to block 501 of FIG. 5 for initializing execution environments. For example, multiple virtual machine instances and/or host computing devices can initially use and/or share the same base execution environment.

At block 702, initial execution environment state can be received. Block 702 of FIG. 7 for receiving initial execution environment state can be similar to block 502 of FIG. 5 for receiving initial execution environment state. For example, the provisioning service 114 can receive the initial execution environment state from one or more host computing devices.

At block 704, a code-execution request can be received. For example, the gateway service 112 can receive a code-execution request from the user computing device 102A. The request can be processed in part by the provisioning service 114 and/or the on-demand code execution system 110 as described herein.

At block 706, the user code can be executed. For example, user code can be executed within the execution environment of the host computing devices 150D or 150E. Block 706 of FIG. 7 for executing user code can be similar to block 506 of FIG. 5 for executing user code. As described herein, in the case of degrading performance, the code instructions can be executed on the first host computing device 150D and eventually can be migrated to the second host computing device 150E. In other cases and/or embodiments, the same code instructions may be executed on the first host computing device 150D and the second host computing device 150E to determine which host device performs executing the code instructions better. Also at block 706, while the user code instructions execute in the execution environments the provisioning service 114 can receive state from the host computing devices 150D or 150E.

At block 707, the execution environments can be managed. The provisioning service 114 can manage the execution environments of the host computing devices 150D, 150E. The provisioning service 114 can determine that a host computing device, such as the first host computing device 150D, has a performance issue associated with the execution of the first code instructions on the host computing device. In that case (where there is degrading or poor performance by the first host computing device 150D), the provisioning service 114 can receive intermediate execution environment state. The provisioning service 114 can pause execution of the first code instructions in the execution environment on the virtual machine instance of the first host computing device 150D. The provisioning service 114 can then receive intermediate hardware processing state, intermediate memory device state, and/or intermediate storage device state. The intermediate execution environment state can be transmitted to the second host computing device 150E. The provisioning service 114 can initialize an execution environment on a virtual machine instance of the second host computing device 150E according to intermediate execution environment state (such as the intermediate hardware processing state, intermediate memory device state, and/or intermediate storage device state). The provisioning service 114 can cause the execution of the code instructions to resume on the second host computing device 150E instead of the first host computing device 150D, thereby completing the migration.

As described herein, management the execution environments of multiple host computing devices can also include running the code instructions on multiple devices and determining which host device performs better (i.e., AB testing). After some execution of the code instructions on the first host computing device 150D, the provisioning service 114 can gather first performance data regarding execution of the code instructions. Similarly, after some execution of the code instructions on the second host computing device 150E, the provisioning service 114 can gather second performance data regarding execution of the code instructions. The provisioning service 114 can calculate performance metrics from the performance data, such as processor, memory, and/or storage performance. The provisioning service 114 can compare the performance data from the host computing devices 150D, 150E to determine that relative to one another, one host computing device has a higher performance metric than the other for executing the same or similar code instructions. In response to determining that one host computing device is performing poorer than the other, the provisioning service 114 can cancel execution of the code instructions for the host computing device.

At block 708, the execution environments of multiple host computing devices can be reset. For example, in the case of an execution of code instructions that is cancelled, the execution environment may be reused again, and in that case, the execution environment should be reset as described herein. In another case, where code instructions are migrated to another execution environment on another host computing device, following completion of the execution of the code instructions, the execution environment may still need to be reset to be used again. Block 708 of FIG. 7 for resetting execution environments may be similar to block 508 of FIG. 5 for resetting execution environments.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A computer implemented method comprising:
under control of a computer hardware processor configured with specific computer executable instructions, receiving, from a host computing device in an on-demand code execution system, first hardware processor state from a hardware processor of the host computing device;
receiving, from the host computing device, first storage device state from a storage device of the host computing device;
causing code instructions to execute in an execution environment on a virtual machine instance of the host computing device;
while causing the code instructions to execute in the execution environment on the virtual machine instance of the host computing device,
receiving, from the host computing device, memory device state from a memory device of the host computing device, wherein causing the code instructions to execute causes:
the hardware processor of the host computing device to change to a second hardware processor state,
the storage device of the host computing device to change to a second storage device state, and
the memory device of the host computing device to change in state; and
resetting the execution environment on the virtual machine instance of the host computing device, wherein resetting the execution environment further comprises:
transmitting reset instructions to the hardware processor of the host computing device, wherein the reset instructions are configured to:
cause the hardware processor of the host computing device to revert to the first hardware processor state, and
flush a cache of the hardware processor;
causing the storage device of the host computing device to revert back to the first storage device state; and
causing the memory device of the host computing device to revert to an initial state based at least in part on the memory device state.

2. The computer implemented method of claim 1, wherein causing the code instructions to execute causes:
recording, in the host computing device, the memory device state that indicates a memory page that was accessed or modified.

3. The computer implemented method of claim 2, wherein recording the memory device state that indicates the memory page that was accessed further comprises:
generating a duplicate memory page of the memory page that was accessed.

4. The computer implemented method of claim 3, wherein causing the memory device of the host computing device to revert to the initial state based at least in part on the memory device state further comprises discarding the duplicate memory page.

5. The computer implemented method of claim 2, wherein recording the memory device state that indicates the memory page that was accessed further comprises:
generating a duplicate memory page of the memory page that was modified.

6. A system comprising:
a data storage medium; and
one or more computer hardware processors in communication with the data storage medium, the one or more computer hardware processors configured to execute computer-executable instructions to at least:
receive, from a host computing device in an on-demand code execution system, first hardware processor state from a hardware processor of the host computing device;
cause first code instructions to execute in an execution environment on a virtual machine instance of the host computing device;
while causing the first code instructions to execute in the execution environment on the virtual machine instance of the host computing device, the one or more computer hardware processors is further configured to:
receive, from the host computing device, memory device state from a memory device of the host computing device, wherein to cause the first code instructions to execute causes:
the hardware processor of the host computing device to change to a second hardware processor state, and
the memory device of the host computing device to change in state; and
reset the execution environment on the virtual machine instance of the host computing device, wherein to reset the execution environment, the one or more computer hardware processors is further configured to:
transmit reset instructions to the hardware processor of the host computing device, wherein the reset instructions are configured to:
cause the hardware processor of the host computing device to revert to the first hardware processor state, and
flush a cache of the hardware processor; and
cause the memory device of the host computing device to revert to an initial state based at least in part on the memory device state.

7. The system of claim 6, wherein to cause the first code instructions to execute, the host computing device is further configured to:
create a bit map that indicates at least a first clean memory page and a second memory page that has been accessed or modified, wherein the memory device state indicates that the second memory page has been accessed or modified.

8. The system of claim 7, wherein to cause the memory device of the host computing device to revert to the initial state based at least in part on the memory device state, the one or more computer hardware processors is further configured to:
identify, using the bit map, the first clean memory page and the second memory page that has been accessed or modified;
maintain the first clean memory page; and
replace the second memory page that has been accessed or modified with a clean second memory page.

9. The system of claim 6, wherein the host computing device further comprises a reset device, wherein the reset device comprises a processor of the one or more computer hardware processors configured to transmit the reset instructions to the hardware processor of the host computing device.

10. The system of claim 6, wherein to cause the memory device of the host computing device to revert to the initial state, at least a portion of the memory device is instructed to power off and power on.

11. The system of claim 6, wherein the first code instructions are received from a first user computing device, and wherein the one or more computer hardware processors is further configured to:
receive, from a second user computing device different from the first user computing device, second code instructions; and
cause the second code instructions to execute in the execution environment on the virtual machine instance of the host computing device.

12. A system comprising:
a data storage medium; and
one or more computer hardware processors in communication with the data storage medium, the one or more computer hardware processors configured to execute computer-executable instructions to at least:
receive, from a first host computing device in an on-demand code execution system, first hardware processor state from a hardware processor of the first host computing device;
while first code instructions execute in a first execution environment on a first virtual machine instance of the first host computing device,
receive, from the first host computing device, memory device state from a memory device of the first host computing device, wherein to cause the first code instructions to execute causes:
the hardware processor of the first host computing device to change to a second hardware processor state, and
the memory device of the first host computing device to change in state; and
reset the first execution environment on the first virtual machine instance of the first host computing device, wherein to reset the first execution environment, the one or more computer hardware processors is further configured to:
transmit reset instructions to the hardware processor of the first host computing device, wherein the reset instructions are configured to:
cause the hardware processor of the first host computing device to revert to the first hardware processor state, and
flush a cache of the hardware processor; and
cause the memory device of the first host computing device to revert to an initial state based at least in part on the memory device state.

13. The system of claim 12, wherein the one or more computer hardware processors is further configured to:
while first code instructions execute in the first execution environment on the first virtual machine instance of the first host computing device,
pause execution of the first code instructions in the first execution environment on the first virtual machine instance of the first host computing device;
receive, from the first host computing device, the second hardware processor state;
transmit, to a second host computing device, the second hardware processor state and the memory device state;
cause a second execution environment on a second virtual machine instance of the second host computing device to initialize according to the second hardware processor state and the memory device state; and
resume execution of the first code instructions in the second execution environment on the second virtual machine instance of the second host computing device.

14. The system of claim 13, wherein the one or more computer hardware processors is further configured to:
determine that there is a performance issue associated with the execution of the first code instructions on the first host computing device.

15. The system of claim 12, wherein the one or more computer hardware processors is further configured to:
gather first performance data regarding execution of the first code instructions on the first host computing device;
cause a second execution of the first code instructions in a second execution environment on a second virtual machine instance of a second host computing device; and
gather second performance data regarding execution of the first code instructions on the first host computing device.

16. The system of claim 15, wherein the one or more computer hardware processors is further configured to:
determine that, relative to the first performance data, the second performance data has a higher performance metric; and
cancel execution of the first code instructions on the first host computing device.

17. The system of claim 12, wherein the first host computing device comprises a storage device, the storage device comprising a trusted storage sector, wherein the one or more computer hardware processors is further configured to:
while first code instructions execute in the first execution environment on the first virtual machine instance of the first host computing device,
receive, from the first host computing device, first storage device state that indicates that first data was stored on the trusted storage sector,
wherein to reset the first execution environment, the one or more computer hardware processors is further configured to:
maintain the first data in the trusted storage sector.

18. The system of claim 17, wherein the one or more computer hardware processors is further configured to:
cause second code instructions to execute in the first execution environment on the first virtual machine instance of the first host computing device; and
while second code instructions execute in the first execution environment on the first virtual machine instance of the first host computing device,
receive, from the first host computing device, second storage device state that indicates that the first data was accessed on the trusted storage sector.

19. The system of claim 12, wherein the one or more computer hardware processors is further configured to:
initialize a base execution environment on the first virtual machine instance of the first host computing device; and
insert customized data for the first code instructions into the base execution environment to result in the first execution environment, wherein execution of the first code instructions in the first execution environment accesses the customized data.

20. A system comprising:
a data storage medium; and
one or more computer hardware processors in communication with the data storage medium, the one or more computer hardware processors configured to execute computer-executable instructions to at least:

receive, from a host computing device in an on-demand code execution system, first hardware processor state from a hardware processor of the host computing device;
cause first code instructions to execute in an execution environment on a virtual machine instance of the host computing device;
while causing the first code instructions to execute in the execution environment on the virtual machine instance of the host computing device, the one or more computer hardware processors is further configured to:
receive, from the host computing device, memory device state from a memory device of the host computing device, wherein to cause the first code instructions to execute causes:
the hardware processor of the host computing device to change to a second hardware processor state, and
the memory device of the host computing device to change in state; and
reset the execution environment on the virtual machine instance of the host computing device, wherein to reset the execution environment, the one or more computer hardware processors is further configured to:
transmit reset instructions to the hardware processor of the host computing device, wherein the reset instructions are configured to cause the hardware processor of the host computing device to revert to the first hardware processor state,
wherein the host computing device further comprises a reset device, wherein the reset device comprises a processor of the one or more computer hardware processors configured to transmit the reset instructions to the hardware processor of the host computing device; and
cause the memory device of the host computing device to revert to an initial state based at least in part on the memory device state.

21. A system comprising:
a data storage medium; and
one or more computer hardware processors in communication with the data storage medium, the one or more computer hardware processors configured to execute computer-executable instructions to at least:
receive, from a first host computing device in an on-demand code execution system, first hardware processor state from a hardware processor of the first host computing device;
while first code instructions execute in a first execution environment on a first virtual machine instance of the first host computing device,
receive, from the first host computing device, memory device state from a memory device of the first host computing device, wherein to cause the first code instructions to execute causes:
the hardware processor of the first host computing device to change to a second hardware processor state, and
the memory device of the first host computing device to change in state;
reset the first execution environment on the first virtual machine instance of the first host computing device, wherein to reset the first execution environment, the one or more computer hardware processors is further configured to:
transmit reset instructions to the hardware processor of the first host computing device, wherein the reset instructions are configured to cause the hardware processor of the first host computing device to revert to the first hardware processor state; and
cause the memory device of the first host computing device to revert to an initial state based at least in part on the memory device state;
gather first performance data regarding execution of the first code instructions on the first host computing device;
cause a second execution of the first code instructions in a second execution environment on a second virtual machine instance of a second host computing device; and
gather second performance data regarding execution of the first code instructions on the first host computing device.

* * * * *